(12) United States Patent
Barenski, Jr. et al.

(10) Patent No.: US 9,163,654 B2
(45) Date of Patent: Oct. 20, 2015

(54) SCREW FOR COMPOSITE/PLASTIC MATERIALS

(71) Applicants: Peter Barenski, Jr., Stockbridge, MA (US); Joseph A. Pieciak, Jr., West Springfield, MA (US)

(72) Inventors: Peter Barenski, Jr., Stockbridge, MA (US); Joseph A. Pieciak, Jr., West Springfield, MA (US)

(73) Assignee: Handy & Harman, White Plains, NY (US)

( * ) Notice: Subject to any disclaimer, the term of this patent is extended or adjusted under 35 U.S.C. 154(b) by 343 days.

(21) Appl. No.: 13/744,993

(22) Filed: Jan. 18, 2013

(65) Prior Publication Data

US 2013/0189052 A1    Jul. 25, 2013

Related U.S. Application Data

(60) Provisional application No. 61/589,045, filed on Jan. 20, 2012.

(51) Int. Cl.
| | |
|---|---|
| *F16B 35/04* | (2006.01) |
| *F16B 35/00* | (2006.01) |
| *F16B 23/00* | (2006.01) |
| *F16B 25/00* | (2006.01) |
| *F16B 25/10* | (2006.01) |

(52) U.S. Cl.
CPC ............... *F16B 35/00* (2013.01); *F16B 23/00* (2013.01); *F16B 25/0015* (2013.01); *F16B 25/0047* (2013.01); *F16B 25/0052* (2013.01); *F16B 25/0063* (2013.01); *F16B 25/0084* (2013.01); *F16B 25/106* (2013.01)

(58) Field of Classification Search
CPC .............. F16B 25/001; F16B 25/0031; F16B 25/0057; F16B 25/0063; F16B 25/0068; F16B 25/0073; F16B 33/02; F16B 35/04; F16B 35/041; F16B 2033/025; F16B 25/0021; F16B 25/0052; F16B 23/00
USPC .................. 411/403, 411, 412, 413, 420, 417
See application file for complete search history.

(56) References Cited

U.S. PATENT DOCUMENTS

| | | | | |
|---|---|---|---|---|
| 3,176,746 | A * | 4/1965 | Walton ........................ | 411/259 |
| 3,682,507 | A * | 8/1972 | Waud ............................ | 411/413 |
| 5,110,245 | A * | 5/1992 | Hiroyuki ....................... | 411/421 |
| 5,141,376 | A * | 8/1992 | Williams et al. ........... | 411/387.4 |
| 6,176,664 | B1 | 1/2001 | Roberts | |
| 6,494,638 | B1 | 12/2002 | Donaldson | |
| 6,979,163 | B2 * | 12/2005 | Brletich et al. .............. | 411/418 |
| 7,654,785 | B2 * | 2/2010 | Chen ............................ | 411/421 |
| 2003/0026675 | A1 * | 2/2003 | McGovern et al. .......... | 411/412 |
| 2006/0201581 | A1 * | 9/2006 | Belinda et al. ............... | 144/344 |

(Continued)

OTHER PUBLICATIONS

Search Report Mar. 13, 2013.

*Primary Examiner* — Roberta Delisle
(74) *Attorney, Agent, or Firm* — Alix, Yale & Ristas, LLP

(57) ABSTRACT

A screw for composite or plastic material comprises a head having a socket which is rotatably couplable for application of a torque. An elongated shank extends from the head and terminates a tapered threaded distal tip. The shank has one portion having an enlarged diameter and a second portion having a reduced diameter. The first portion is traversed by a left hand thread having a first pitch. The second portion is traversed by a right hand thread having a second pitch which is less than the first pitch. An unthreaded land portion adjacent the tip extends at least twice the second pitch. For some embodiments, some thread segments have notches. The fastener is particularly adapted for very dense material.

20 Claims, 5 Drawing Sheets

(56) References Cited

U.S. PATENT DOCUMENTS

| | | |
|---|---|---|
| 2007/0059122 A1* | 3/2007 | Lin .............................. 411/412 |
| 2007/0128001 A1 | 6/2007 | Su |
| 2007/0204552 A1* | 9/2007 | Onofrio ......................... 52/698 |
| 2007/0217887 A1* | 9/2007 | Lin .............................. 411/413 |
| 2007/0297873 A1* | 12/2007 | Wieser et al. ................. 411/411 |
| 2008/0263984 A1 | 10/2008 | Gillis et al. |
| 2009/0097942 A1 | 4/2009 | Weiss et al. |
| 2011/0222984 A1 | 9/2011 | Gillis et al. |

* cited by examiner

SCREW FOR COMPOSITE/PLASTIC MATERIALS

CROSS-REFERENCE TO RELATED APPLICATION

This application claims the priority of U.S. Provisional Patent Application No. 61/589,045 filed Jan. 20, 2012, the entirety of which is incorporated herein by reference.

BACKGROUND OF THE TECHNOLOGY

This technology relates to fasteners which are employed for fastening composite and plastic materials to a support structure. More particularly, the disclosure relates to deck screws employed for securing dense composite and plastic materials.

Numerous fasteners have been advanced for fastening deck members which are composed of composite material. Several of these such deck fasteners are directed to eliminating the volcanoing or mushrooming effect. As the technology of composite materials has advanced, the denseness of the composite members has increased. The increased denseness has had a significant impact on the effectiveness of conventional deck screws. Accordingly, many deck screws which were adapted to perform in earlier composite environments are significantly less effective in the more dense material. A significant issue resides in the difficulties of driving fasteners into very dense composite materials.

SUMMARY

Briefly stated, a fastener for composite or plastic material comprises a head rotatably couplable for application of a torque and an elongated shank which extends from the head and terminates at a tapered distal tip. The shank comprises a first portion having an enlarged diameter and a second portion having a reduced diameter. The first portion is traversed by a left hand thread. The second portion has a first segment traversed by a right hand thread and a second unthreaded segment or land adjacent the tip.

The right hand thread L of the second shank portion has a pitch and the unthreaded segment or land extends a longitudinal distance greater than twice the pitch. The right hand thread of the second portion has a longitudinal series of aligned notches. The notches are located at each 360° thread spacing along the entire right hand thread. The tip portion is traversed by a tip thread having a tip thread pitch. The right hand thread has a thread pitch equal to the tip thread pitch. The tip also has a plurality of notches.

In one embodiment, the second unthreaded segment is approximately 0.27 inches in longitudinal length and the entire fastener is approximately 2.75 inches in longitudinal length. In a second embodiment, the second unthreaded segment is approximately 0.25 inches in longitudinal length for a 2.75 inch fastener.

The head preferably has a #1 square socket configuration. In one preferred embodiment, the left hand thread has a pitch of 9 threads per inch and the right hand thread has a pitch of 12 threads per inch. The left hand thread has a 48° included thread profile angle, and the right hand thread has a 30° included thread profile angle.

DETAILED DESCRIPTION

Figure 1:
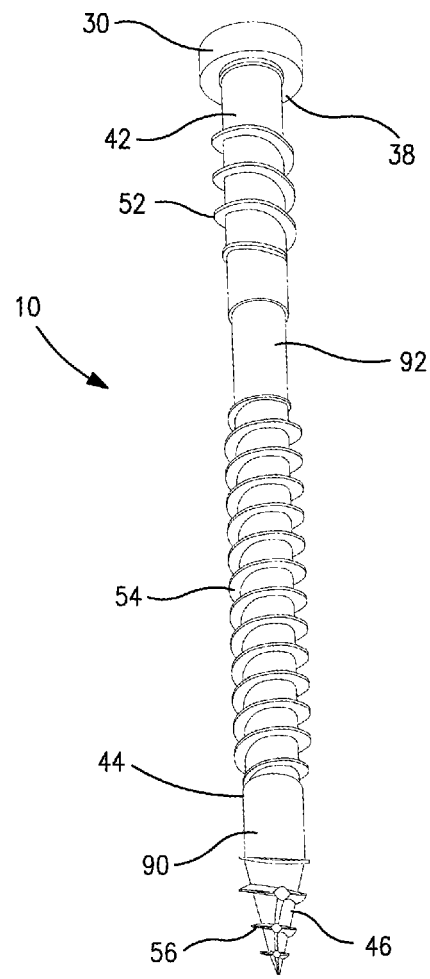
FIG. 1 is a perspective view of a screw for securing composite/plastic material.
Figure 2:
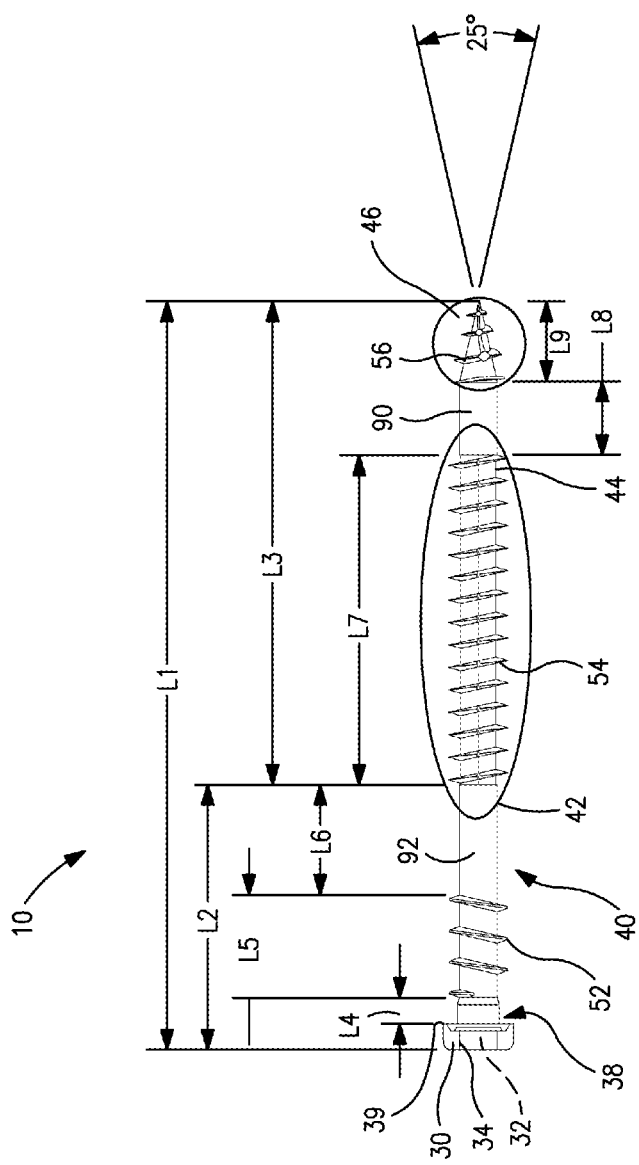
FIG. 2 is a longitudinal view, partly in phantom and partly in diagrammatic form, of the screw for securing composite/plastic material of FIG. 1.
Figure 3:
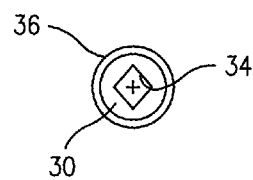
FIG. 3 is an end view of a head portion of the screw of FIG. 2.

With reference to FIGS. 1 and 2, a screw, which is especially adapted for securing composite or plastic materials, is designated by the numeral 10. Screw 10 is efficiently configured for usage with very dense materials (not illustrated). The screw 10 is preferably driven so that the head 30 is sunk below the upper surface of the material and forms a cylindrical counterbore above the head. The screw 10 can be driven without volcanoing or mushrooming of the material around the head and can be relatively easily driven without an intense resistance to application of torque during the driving process. The material remnants removed during the driving process are expelled by the screw 10 in the form of small curls and shavings which are reduced to small particle-like segments.

Embodiment A

The head 30 includes a recess 32 which, at an upper portion, is defined by a #1 square socket 34 adapted for coupling with a torque driver bit (not illustrated). The socket 34 preferably has a minimum depth of 0.075 inches and preferably a depth from 0.075 inches to 0.095 inches. The corners of the socket 34 may be rounded.

The head 30 includes a tapered skirt-like periphery 36 which includes a recess on the underside 38 and a lower cutting rim 39. The underside 38 of the head is configured to prevent material remnants from being displaced past the head during the driving process after capturing composite material and trapping same on its underside. The cutting rim 39 is adapted to provide a cylindrical opening in the composite material and to present a clean finished setting of the screw in the drive bore so that the top surface of the head is below the surface of the dense composite material.

Figure 4:
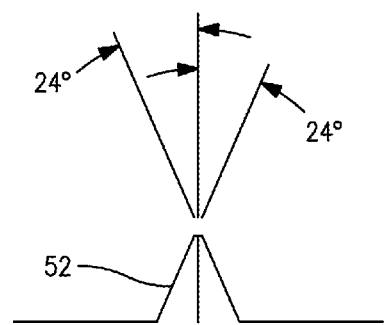
FIG. 4 is a diagrammatic view illustrating a representative thread profile for a top portion of the screw of FIG. 2.

The shank 40 has an upper portion 42 proximate the head which has a larger diameter than that of the lower portion 44. The upper portion 42 includes a left hand thread 52. The left hand thread 52 extends a length L5 of approximately 0.450 inches and has a pitch of ⅑ inch or 9 threads per inch. Thread 52 has an angle of 48 degrees as illustrated in FIG. 4. In embodiment A thread 52, has a minor thread diameter of 0.133 inches and a major diameter of 0.205 inches.

Figure 5:
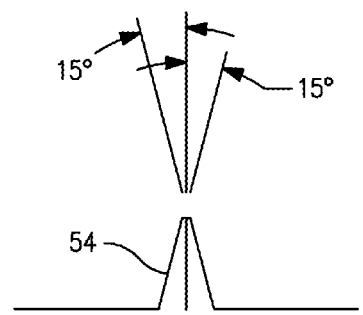
FIG. 5 is a diagrammatic view illustrating a representative thread profile for a bottom portion of the screw of FIG. 2.
Figure 6:
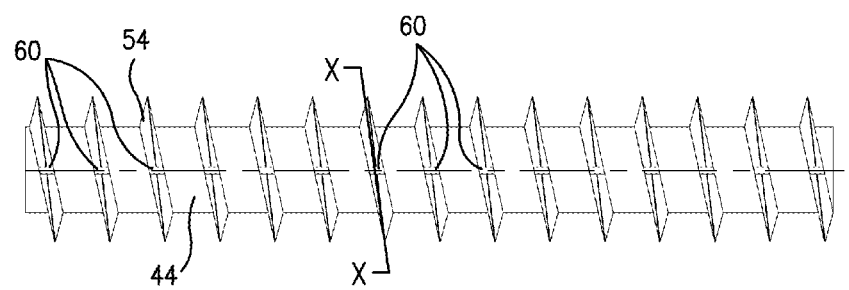
FIG. 6 is an enlarged longitudinal view of a medial portion of the screw of FIG. 2.
Figure 7:
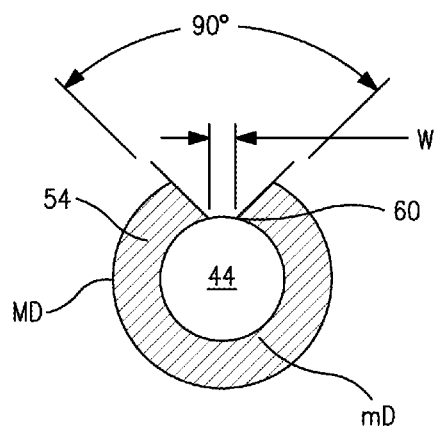
FIG. 7 is an enlarged cross-sectional view, partly in diagram form, of the screws taken along the line X-X of FIG. 6.

With additional reference to FIGS. 5-7, the lower shank 44 is traversed by a right hand thread 54 which has a pitch of 1/12 inch or 12 threads per inch and has an included thread angle of 30 degrees (as illustrated in the profile of FIG. 5). Thread 54 has a minor diameter "md" of 0.123 inches and a major diameter "MD" of 0.192 to 0.196 inches.

The thread 54 has a longitudinal length of L7 of approximately 1.196 inches and is traversed by a longitudinal series of notches 60. As best illustrated in FIG. 7, the notches 60 have a depth from the major diameter MD to approximately the minor diameter md of the lower shank portion. Each notch width w is approximately 0.016 inch.

It should be appreciated that there is an unthreaded portion or land 90 between the end of thread of 54 and the thread of the tip. This unthreaded portion or land 90 in embodiment A extends longitudinally a distance L8 of 0.269 inches. In addition, there is an upper land 92 between the left hand thread and the start of the right hand thread. Upper land 92 extends longitudinally a distance L6 of 0.435 inches. The upper land 92 may be longitudinally bifurcated with two diameters.

Figure 8:
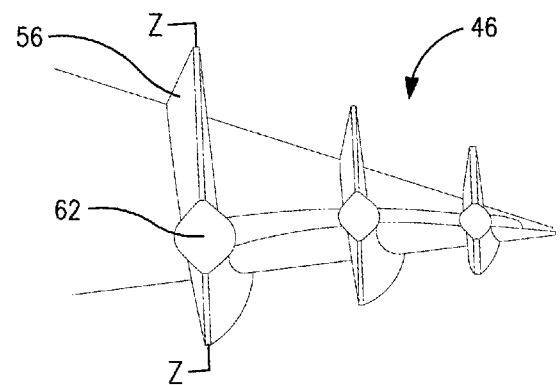
FIG. 8 is an enlarged fragmentary view, partly in diagram form, of a tip portion of the screw of FIG. 2.
Figure 9:
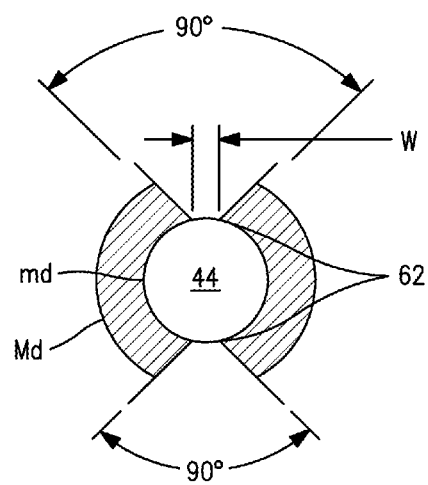
FIG. 9 is a sectional view, partly in diagram form, of the screw taken along the line Z-Z of FIG. 8.

With reference to FIGS. 8 and 9, the shank terminates in a tip 46 which has a spiral thread 56. A pair of opposed notches 62 in the spiral thread each has a width W of 0.016 inch. Additional notches 64 and 66 may be employed. The notches 62, 64 and 66 are slightly out of angular phase to essentially create a split point. Each of the notches 62, 64 and 66 preferably do not extend below the minor diameter md. In some embodiments, just notches 64 and 66 do extend below the minor diameter.

Various approximate dimensions for embodiment A of screw 10 with reference to FIG. 2 are summarized in Table A below.

TABLE A

| | |
|---|---|
| L1 | 2.750 ins |
| L2 | 1.075 ins |
| L3 | 1.675 ins |
| L4 | 0.095 ins |
| L5 | 0.450 ins |
| L6 | 0.435 ins |
| L7 | 1.196 ins |
| L8 | 0.269 ins |
| L9 | 0.210 ins |

Embodiment B

For a second embodiment B of a screw 10, the head 30 is identical to that described for embodiment A. The left hand thread 52 extends a length L5 of approximately 0.379 inches and has a pitch of 1/9 inch or 9 threads per inch. Thread 52 has an angle of 48 degrees as illustrated in FIG. 4. In embodiment B, thread 52 has a minor thread diameter of 0.130 inches and a major diameter of 0.203 to 0.208 inches.

With additional reference to FIGS. 5-7 for the second embodiment B, the lower shank 44 is traversed by a right hand thread 54 which has a pitch of 1/12 inch or 12 threads per inch and has an included thread angle of 30 degrees (as illustrated in the profile of FIG. 5). Thread 54 has a minor diameter "md" of 0.118 inches and a major diameter "MD" of 0.192 to 0.196 inches.

The thread 54 has a longitudinal length of L7 of approximately 1.365 inches and is traversed by a longitudinal series of notches 60. As best illustrated in FIG. 7, the notches 60 have a depth from the major diameter MD to approximately the minor diameter md of the lower shank portion. Each notch width w is approximately 0.016 inch.

The unthreaded portion or land 90 in embodiment B, extends longitudinally a distance L8 of 0.250 inches. In addition, there is an upper land 92 between the left hand thread and the start of the right hand thread. In the second embodiment, upper land 92 extends longitudinally a distance L6 of 0.255 inches.

For embodiment B, the shank terminates in a tip 46. A pair of opposed notches 62 in the spiral thread each has a width W of 0.016 inch. Additional notches 64 and 66 may be employed.

Various approximate dimensions for embodiment B of screw 10 with reference to FIG. 2 are summarized in Table B below.

TABLE B

| | |
|---|---|
| L1 | 2.750 ins |
| L2 | 0.850 ins |
| L3 | 1.900 ins |
| L4 | 0.095 ins |
| L5 | 0.379 ins |
| L6 | 0.255 ins |
| L7 | 1.365 ins |
| L8 | 0.250 ins |
| L9 | 0.285 ins |

It should be appreciated that the following relationships apply for screw 10:

$$P1 > P2$$

$$L8 \geq 2(P2)$$

$$P2 = P3$$

Where P1 is the pitch spacing of the left hand thread of the first shank portion;

P2 is the pitch spacing of the right hand thread of the second shank portion;

P3 is the pitch spacing of the tip portion; and

L8 is the longitudinal distance of the land 90.

While preferred embodiments have been set forth for illustration purposes, the foregoing description should not be deemed a limitation of the invention. Accordingly, various modifications, adaptations and alternatives may occur to one skilled in the art without departing from the spirit and the scope of the present invention.

The invention claimed is:

1. A fastener for composite or plastic material comprising:
   a head rotatably couplable for application of a torque;
   an elongated shank extending from said head and terminating at a tapered distal tip and comprising a first portion having an enlarged diameter and a second portion having a reduced diameter;
   said first portion traversed by a left hand thread; and
   said second portion having a first segment traversed by a right hand thread and a second unthreaded segment adjacent said tip, wherein said tip is traversed by a tip thread.

2. The fastener of claim 1 wherein the right hand thread has a pitch and said second unthreaded segment extends a longitudinal distance greater than twice the pitch.

3. The fastener of claim 1 wherein said right hand thread of said second portion has a longitudinal series of aligned notches.

4. The fastener of claim 3 wherein said aligned notches are located at each 360° thread spacing along the entire right hand thread.

5. The fastener of claim 1 wherein said tip thread has a tip thread pitch, and said right hand thread has a second thread pitch equal to said tip thread pitch.

6. The fastener of claim 5 wherein said tip thread has a plurality of notches.

7. The fastener of claim 1 wherein said second unthreaded segment is approximately 0.27 inches in longitudinal length, and the fastener is approximately 2.75 inches in longitudinal length.

8. The fastener of claim 1 wherein said second unthreaded segment is approximately 0.25 inches in longitudinal length, and the fastener is approximately 2.75 inches in longitudinal length.

9. The fastener of claim 1 wherein the left hand thread has a pitch of 9 threads per inch and the right hand thread has a pitch of 12 threads per inch.

10. A fastener for composite or plastic material comprising:
- a head having a socket rotatably couplable for application of a torque;
- an elongated shank extending from said head and terminating at a distal tip and comprising a first portion having a first diameter and a second portion having a second diameter smaller than said first diameter;
- said first portion traversed by a left hand thread having a first pitch; and
- said second portion traversed by a right hand thread having a second pitch less than the first pitch, and an unthreaded land portion adjacent said tip which extends longitudinally at least twice the second pitch and the tip having a tip thread.

11. The fastener of claim 10 wherein said right hand thread comprises a series of 360° thread segments with a longitudinally aligned series of notches in adjacent thread segments.

12. The fastener of claim 11 wherein the left hand thread has a thread profile with a 48° included angle.

13. The fastener of claim 10 wherein said tip has a tip pitch substantially equal to said second pitch.

14. The fastener of claim 10 wherein said head has a #1 square socket configuration.

15. The fastener of claim 10 wherein the first pitch is 9 threads per inch.

16. The fastener of claim 10 wherein the second pitch is 12 threads per inch.

17. The fastener of claim 16 wherein said right hand thread has a thread profile included angle of 30°.

18. The fastener of claim 10 wherein the unthreaded land portion is approximately 0.250 inches and the length of said fastener is approximately 2.75 inches.

19. The fastener of claim 10 wherein the left hand thread has a major diameter of approximately 0.205 inches and a minor diameter of approximately 0.130 inches.

20. The fastener of claim 10 wherein said right hand thread has a major diameter of approximately 0.194 inches and a minor diameter of approximately 0.118 inches.

* * * * *